United States Patent [19]

Nogueira et al.

[11] 4,151,077
[45] Apr. 24, 1979

[54] PROCESS FOR ELIMINATION OF MERCURY FROM INDUSTRIAL WASTE WATERS BY MEANS OF EXTRACTION WITH SOLVENTS

[76] Inventors: Eduardo D. Nogueira, Avda. Mediterraneo No. 47; Angel L. R. Abad, Gabriel Ruiz No. 7; Manuel B. Muntadas, Gil de Andrada No. 12; Jose M. R. Vega, San Ernesto No. 12, all of Madrid, Spain

[21] Appl. No.: 791,004

[22] Filed: Apr. 26, 1977

[30] Foreign Application Priority Data

Apr. 28, 1976 [ES] Spain .................................. 447.417

[51] Int. Cl.$^2$ .......................................... B01D 11/00
[52] U.S. Cl. .................................. 210/21; 210/38 B; 75/101 BE; 75/121; 423/100
[58] Field of Search .................... 210/21, 30 B, 63 R, 210/59, 296, 511; 75/81, 101 BE, 121; 423/100; 162/29

[56] References Cited

U.S. PATENT DOCUMENTS

| 2,959,462 | 8/1960 | Goaen | 75/101 BE |
| 3,083,079 | 3/1963 | Calkins | 423/100 |
| 3,104,971 | 9/1963 | Olson | 75/101 BE |
| 3,528,804 | 4/1970 | Spitzer | 75/101 BE |
| 3,755,161 | 8/1973 | Yokota | 75/101 BE |
| 3,769,205 | 10/1973 | Williams | 423/100 |
| 3,873,581 | 3/1975 | Fitzpatrick | 75/101 BE |
| 3,899,570 | 8/1975 | Chapman | 75/100 BE |
| 4,032,613 | 6/1977 | Schultze | 75/101 BE |

FOREIGN PATENT DOCUMENTS

465291 8/1935 United Kingdom ....................... 210/21

OTHER PUBLICATIONS

Solvent Extraction of Inorganic Ions with Tri-N-Octyl Phosphine Oxide, Nippon Gershyoku Gahharshi, pp. 41, 118–126.
Solvent Extraction of Uranium . . ., Blake; Proceeding International Conference on Peaceful Uses of AE, vol. 28, 1958, pp. 289–298.
Recovery of Zinc, Cadmium and Mercury II . . ., Smith, J. Appl. Chem. Biotechnol., 1975, pp. 379–402.
Abstract of Israeli Patent 44,867.
Chelating Agents and Metal Chelates, Dwyer Academic Press 1904, p. 120.
Mehrota, Thio and Thio-B Diketone, Derivatives of Elements, Inorganic Chimica Act. Review, pp. 111–116, 1968.
Synergistic Extraction of Mercury II . . . Proceeding of Intermatic Solvent Extraction Conference, 197 p. 1106–1111, Society Chem Ind. London.
Solvent Extraction in Analytical Chemistry, Morrison, New York, 1957, p. 110.
The Chemistry Society, Annual Reports of The Progress of Chemistry, for 1959, 1960, London, vol. LVI, pp. 108–109.
Proceedings I.S.E.C. 1971, Society of Chemical Industry, London, 1971, vol. II, pp. 1112–1119.
Ion Exchange and Solvent Extraction, Marcus Kerts Wiley, New York, 1969, pp. 437–447, 954.

*Primary Examiner*—Charles N. Hart
*Assistant Examiner*—Ernest G. Therkorn

[57] ABSTRACT

The present invention relates to a process for eliminating mercury from industrial waste waters by means of extraction with solvents, which includes its treatment with an oxidant agent to pass the whole of the mercury to its state of valence $Hg^{++}$, its subsequent treatment by direct contact with a reducer in order to eliminate the excess oxidant which otherwise would degrade the agent of extraction and with an organic solution that contains the agent that extracts the mercury and leaves it free from the latter for its evacuation into the environment, and regeneration of the agent of extraction by means of its treatment with an aqueous solution of chloride ions, the mercury being recovered in the form of an aqueous solution of mercuric chloride, relatively concentrated.

14 Claims, 1 Drawing Figure

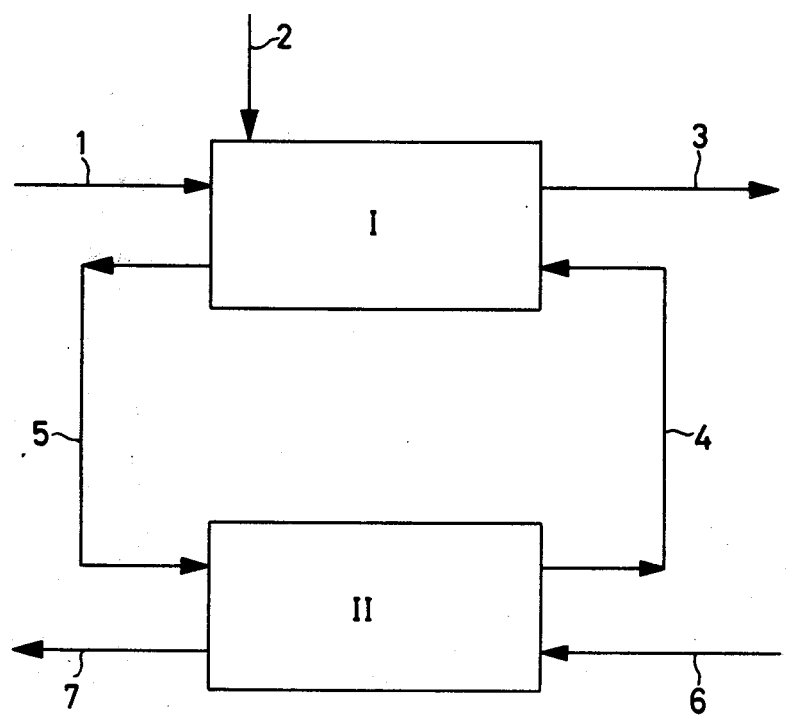

PROCESS FOR ELIMINATION OF MERCURY FROM INDUSTRIAL WASTE WATERS BY MEANS OF EXTRACTION WITH SOLVENTS

The problem of pollution produced by discharge of water that contains mercury is one of world-wide scope. The toxic character of mercury, the ease with which it is accumulated in fish and the possibility of poisoning by ingestion of the latter, has created a situation where it is necessary to decontaminate all the effluents that contain mercury.

In chemical processes mercury is employed in pharmaceutical industries, paper manufacture, agriculture, paint manufacture, etc.; but without doubt the industrial effluents which produce the largest discharge of mercury are those originating in the chlorine-soda industry, where electrolytic cells with mercury cathodes are employed. Special attention has been devoted to the decontamination of these waters.

The existing processes for eliminating mercury from liquid effluents employ the techniques of precipitation-filtration or adsorption.

It is possible to eliminate mercury by precipitation by reducing it to a metallic form, precipitating it as a sulphide or as an oxide. Among the techniques of adsorption, the most widespread method is the employment of ion exchange resins.

The purpose of the present invention is to eliminate mercury from the waters that contain it, but by employing the technique of extraction with solvents.

The waters that contain mercury will be placed in contact with an immiscible organic phase, and the mercury will be passed from the water to the organic phase in a stage of extraction, thus obtaining an aqueous effluent that does not contain mercury, and an organic phase that does contain it.

In a subsequent stage—the stage of re-extraction—the mercury is eliminated from the organic phase by treating it with an acid solution, the organic phase remaining in a condition to be recycled for extraction. The mercury emerges from the system in the form of a solution with a concentration of between 100 and 1,000 parts of mercury, and normally as a solution of mercuric chloride.

In summary, the process that constitutes the subject of this invention extracts the mercury dissolved in industrial waste and eliminates it from the process in the form of a concentrated solution of the said mercury, an organic phase serving as an intermediate vehicle. The object of the invention being known, a description will now be given of the bases and special features of the invention in question.

The organic phase employed in extraction is formed by three components, of which only one is active, and whose functions in the extraction process are the following:

1. Diluent—This is the predominant constituent of the organic phase; it serves as a carrier and solvent of the extraction reagent. It is constituted by a hydrocarbon or fraction of petroleum distillates, similar to kerosene or to gas-oil.
2. Modifier—Formed by an alkylphosphoric ester, oxide of phosphine or alkyl alcohol of long chain. Its function is secondary, but its presence aids the separation of phases in the stage of extraction, and collaborates in the solubility of the organic compound of mercury in the organic phase.
3. Extraction reagent—This is a mercaptan, thioalcohol or thiophene. It is the active component of the organic phase, the real reagent or agent of extraction. This mercaptan reacts with the mercury to form mercuric mercaptide which is retained within the organic phase.

In order to simplify the reactions, the mercaptan will be represented by RSH, R being an alkyl or aryl radical. Depending on the molar relations of mercaptan to mercury, and for the case of hydrochloric waters containing mercury (the most frequent in the chlorine-soda processes) the reactions of extraction are the following:

$$R\text{---}SH + Cl_2Hg = R\text{---}S\text{---}Hg\text{---}Cl + H^+ \qquad (1)$$

$$2R\text{---}SH + Cl_2Hg = (R\text{---}S)_2Hg + 2H^+ \qquad (2)$$

The mercury mercaptide formed is maintained in the organic phase, thus eliminating the mercury from the water to be treated. The following stage in the process is that of re-extraction. In order to remove the mercury from the organic phase solutions of strong non-oxidant acids are employed. The reaction of re-extraction is the following:

$$(R\text{---}S)_2Hg + 2H^+ = Hg^{++} + 2R\text{---}S\text{---}H \qquad (3)$$

In order to leave the mercaptan in a non-combined form (R—S—H) an acid is necessary, but the re-extraction will be more complete (greater displacement of the reaction 3 towards the right), when the acid employed in re-extraction is accompanied by an anion capable of complexing the mercury ion. This would be the case of a concentrated solution of hydrochloric acid and sodium chloride. In this case the reaction would be:

$$(R\text{---}S)_2Hg + 2H^+ + 4Cl^- = 2R\text{---}S\text{---}H + Cl_4Hg^= \qquad (4)$$

This combination of re-extraction reagents is the most advisable for the elimination of mercury in the effluents of a chloride-soda process, because it fulfils the double function of eliminating the mercury from the effluents, and recovering it in a much more concentrated solution of sodium chloride and hydrochloric acid. Both reagents accompanying the mercury are usual and necessary in the chlorine-soda processes, so that their incorporation into the process is exceedingly simple.

The essence of the invention having been sufficiently described, complementary aspects of the said invention are clarified in what follows, such aspects being inherent to the nature of the water or effluent to be treated.

The first aspect is related to the state or nature of the mercury in the water (colloidal metallic mercury, mercury oxides, mercurial ion, mercuric ion, etc.).

As may be observed in the equations (1) and (2), for the purposes of good extraction the mercury should be present in the water as a mercuric ion. Consequently, a stage of prior conditioning would be that of oxidation. For this purpose any sufficiently energetic oxidant may be employed ($MnO_4K$, $Cr_2O_7K_2$, etc.), but for reasons of economy the most advisable are chloride or hypochlorite. The value of the pH in the water is not a controlling factor in the process, but when $Cl_2$ or $ClONa$ are employed as oxidants, if the water has a pH with acid or slightly acid values, there exists a greater security that the whole of the mercury has been oxidized to a mercuric ion.

Another aspect related to the quality of the water is the presence of solids in it. When these solids have concentrations exceeding 0.1 g/l, it is advisable to employ a stage of previous filtration, but subsequent to the oxidation.

The last aspect to be taken into account in the invention is related to the stability of the extraction reagent (thioalcohols or thiophenols). These compounds are easily oxidable, being transformed into disulphides or even into sulphonic acids, according to the reactions.

$$2R-SH \xrightarrow{oxid} R-S-S-R \xrightarrow{oxid} 2R-SO_3H$$

This indicates to us that at the moment of extraction if it is not desired to degrade the mercaptan, there cannot be present in the water any type of ionic oxidant. It is necessary to eliminate the excess of chlorine or oxidant that may be present in the water. For the case of chloride dechlorination with active carbon can be employed, but in general the elimination of oxidants is achieved by adding to the water during the extraction or immediately prior to the extraction a slight excess of reducer.

For this purpose there may be employed any reducer capable of producing a red-ox potential in the water, inferior to 400 millivolts.

For reasons of simplicity and price, the reducers recommended are sulphites, bisulphites, hyposulphites, metabisulphates, etc. In all the cases these anions are oxidated to sulphates, which constitute a natural anion of the waters.

The bases of the invention having been described, together with its principal aspects, in what follows some specific data concerning it are given.

Both the stage of extraction and that of re-extraction can be carried out in any extraction equipment with solvents, and preferably in mixers settlers.

This type of apparatus is that which has been employed in our continuous tests.

The time of agitation or contact to attain the equilibrium depends on the concentrations in the organic and aqueous phases, and on the degree of agitation. In any case, this was less than 5 minutes, with a predominance of values of less than 1 minute.

The separation of phases after extraction and re-extraction does not present any difficulty, if the organic phase contains the appropriate modifier.

The temperature compatible with the process varies between 5° and 90° C.

The concentrations of mercaptan (thioalcohol or thiophene) can vary between 0.01% and 1%, and that of the modifier, especially tributyl phosphate, between 0 and 15%. The choice of the above-mentioned concentrations will be made in accordance with the nature and concentration of mercury in the water to be treated.

In the process of re-extraction any inorganic acid (nonoxidant) may be employed, alone or accompanied by salts of mercury; for preference there will be employed solutions of hydrochloric acid from 1 to 6 molar, with sodium chloride of from 0 to 5 molar.

The invention is illustrated with some non-limitative examples and in order to facilitate its interpretation a drawings is also annexed.

EXAMPLE NO. 1

In this non-limitative example, it is desired to emphasise that both the ioalcohols and the thiophenols are capable of extracting mercury. There is placed in contact in a single stage a water with the following composition:

| Hg | 24.4 mg/l |
|---|---|
| ClNa | 16.5 g/l |
| pH | 3.5 | with two organic phases (in the ration of organic volume to aqueous volume of 2:1) which contain 0.1% by volume of thioalcohol (test 1) and 0.1% of thiophenol (test 2).

The results of this extraction are the following:

| | | Mercury in the water after extraction | |
|---|---|---|---|
| Test No. | Extraction reagent | mg/l | % extracted |
| 1 | Dodecanothiol | <0.01 | >99.95% |
| 2 | Thiocresol | 0.17 | 99.15% |

EXAMPLE NO. 2

In this example it is demonstrated that an organic phase that contains mercury can be re-extracted, by employing solutions of acids or acid plus sodium chloride.

The conditions of the test are the following: Organic phase, composition

| Dodecanothiol | 0.1% v/v |
|---|---|
| Tributyl phosphate | 5 % v/v |
| Kerosene | 94.9% v/v |
| Mercury | 22.5% mg/l |

The volume ratio of the organic phase to the re-extraction solution was, in all cases, 40.

In what follows are the compositions of the re-extraction solutions employed, and the results obtained, expressed as a percentage of mercury extracted.

| Test No. | Composition of re-extraction solution | % of Hg re-extracted |
|---|---|---|
| 1 | ClH 5 M | 67 |
| 2 | ClH 4 M + ClNa 1.5 M | 86 |
| 3 | ClH 3 M + ClNa 2.5 M | 94 |
| 4 | $H_2SO_4$ 4 M | 81 |

EXAMPLE NO. 3

In this example, not limitative, there is shown the importance of the presence of the modifier in the organic phase, in order to maintain soluble in it the mercury mercaptide extracted.

Organic phases with 0.5 0/00 of dodecanothiol and 99.95% of kerosene to which there is added the modifier indicated below, are saturated with mercury mercaptide. After the saturation, an analysis is made of the mercury solubilized in the organic phase. The results are the following:

| | Modifier | | mg/l of mercury |
|---|---|---|---|
| Test No 9 | Nature | % v/v | solubilized |
| 1 | — | 0 | 10 |
| 2 | Tributyl phosphate | 2.5 | 15 |
| 3 | Tributyl phosphate | 5 | 23 |
| 4 | Isodecyl alcohol | 5 | 14 |
| 5 | Tri-octylphosphine oxide | 5 | 31 |

EXAMPLE NO. 4

This has the purpose of demonstrating that in order to extract the mercury in an organic phase that contains mercaptan, it is necessary to have it in a state of valence of two.

A water was prepared with 12 g/l of sodium chloride at pH 3. There was incorporated in this water 17 mg/l of colloidal metallic mercury, obtained by distillation of mercury over the water. In this water—agitated for half an hour—mercury was oxidized with different amounts of chloride. After the oxidation the mercury was extracted with an organic phase with 1°/00 v/v of dodecanothiol, 5% v/v of tributyl phosphate diluted in kerosene. The results of this extraction were the following:

| Amount of $Cl_2$ employed in oxidation (mg/l) | 0 | 50 | 100 |
|---|---|---|---|
| Mercury extracted % | 2.5 | 99.8 | 99.95 |

EXAMPLE NO. 5

In order to give a measurement of the stability of the extraction reagent in the presence of oxidants and to justify the necessity of adding a reducer to the water before the stage of extraction, this example is presented.

A water with 50 mg/l of free chlordine was employed, to which there were added different amounts of $SO_3Na_2$ in order to reduce the chlorine. These waters were placed in contact with an organic phase containing 0.1% of dodecanothiol, there being employed in the contact a ratio of aqueous to organic volume of 20 to 1. After the contact, an analysis was made of the mercaptan content of the organic phase, and the fraction of this reagent that had been destroyed was calculated. The results of this example are:

| Test No. | Oxidant power of the water $Cl_2$ mg/l | red-ox. Millivolts | % of mercaptan destroyed |
|---|---|---|---|
| 1 | 50 | 1020 | 67.5 |
| 2 | <1 | 520 | 21.5 |
| 3 | 0 (excess $SO_2Na_2$) | <300 | <0.5 |

EXAMPLE NO. 6

In this example, not limitative, there are compiled the results obtained in a test of elimination of mercury from a water. The test was carried out on a continuous basis and on a semi-pilot scale. The stages of the process are identified in the figure with Roman numerals and the flows with Arabic numbers.

In each stage the floors utilized are indicated and the functioning between the organic and aqueous phases is counter-current.

The stages are:

| Extraction | (2 floors) | I (See figure) |
|---|---|---|
| Re-extraction | (2 floors) | II (See figure) |

The organic phase employed had the following composition:

| Dodecanothiol | % v/v | 0.1 |
|---|---|---|
| Tributyl phosphate | % v/v | 5 |
| Kerosene | % v/v | 94.9 |

The water tested was an effluent of a chlorine-soda factory. In order to prevent the mercury from becoming insoluble in the transport from the factory of origin to our installations, it was acidulated and oxidized with ClONa. The analysis of the water employed in the test was the following:

| Hg | mg/l | 21.5 |
|---|---|---|
| ClNa | g/l | 14.5 |
| $SO_4Na_2$ | g/l | 5.8 |
| $Cl_2$ | g/l | 0.03 |
| pH | | 3.2 |

In order to eliminate the chlorine present in the water, a solution of sodium sulphite of 2.6 g/l was employed. The solution employed in re-extraction had the following composition:

| ClH | g/l | 94 |
|---|---|---|
| ClNa | g/l | 148 |

A compilation was then made of the volumes and concentrations of mercury of the principal flows, which flows are detailed in the drawing annexed to the present memorandum.

| No. of flow in Figure | Identification | Volume ml/min | Concentration Hg mg/l |
|---|---|---|---|
| 1 | Contaminated water | 1000 | 21.5 |
| 2 | Sodium-sulphite solution | 13 | — |
| 3 | Demercurized water | 1013 | <0.005 |
| 4 | Organic phase feed | 1800 | 1.3 |
| 5 | Organic extract | 1800 | 13.2 |
| 6 | Re-extraction solution | 23 | — |
| 7 | Aqueous extract | 23 | 934 |

What is claimed is:

1. A process for eliminating mercury from industrial waste water by means of solvent extraction, said process comprising the steps of:
   firstly, treating the industrial waste water with an oxidizing agent to transform all mercury to mercury species with valence $Hg^{++}$;
   secondly, reducing the excess oxidizing agent in the industrial waste water by treatment with a reagent selected from the group consisting of sulphites, bisulphites, hyposulphites, and metabisulphites to form sulphate species which will not degrade an extracting agent;
   thirdly, treating the industrial waste water with an organic solution containing an an extractant selected from the group consisting of thioalcohol, thiophenol, thiophene of molecular weights greater than 80 and combinations thereof; a modifier selected from the group consisting of alkylphosphoric esters, oxides of phosphine, fatty alcohols of molecular weights greater than 100 and combinations thereof; and a diluent constituted by mixtures of hydrocarbons similar to kerosene; and
   regenerating the extracting agent by treatment with an aqueous solution of chloride ions to recover the mercury in high concentrations of mercuric chloride in an aqueous solution, and to allow recycling of the extracting agent for further loading with the industrial waste water.

2. The process as claimed in claim 1, wherein said step of oxidizing the mercury includes the steps of adding hypochlorite or chlorine to the waste water and subsequently adjusting the pH of the industrial waste water.

3. The process as claimed in claim 1, wherein the dose of hypochlorite or chlorine used in said oxidizing step is equivalent to between 0 and 1000 mg of chlorine per liter of industrial waste water treated.

4. The process as claimed in claim 1, wherein said oxidizing step includes adjusting the pH to a value less than 8.

5. The process as claimed in claim 4, wherein during said oxidizing step the pH is adjusted to be in the range of 3 to 4.

6. The process as claimed in claim 1, wherein said reducing step includes treatment of the industrial waste water with a reagent having a standard redox potential less than 400 millivolts.

7. The process as claimed in claim 1, wherein said reducing step includes the addition of a dose of reagent at least as great as the amount corresponding stoichiometrically to the amount of the oxidizing agent present.

8. The process as claimed in claim 7, wherein the concentration of the extractant is between 0.01% to 1%, and the concentration of the modifier is between 0 and 15%.

9. The process as claimed in claim 1, wherein said regenerating step includes contacting the organic solution containing mercury with an aqueous acid solution of chloride ions.

10. The process as claimed in claim 1, wherein said regenerating step includes contacting the organic solution with an aqueous acid solution of chloride ions comprised of a mixture of a non-oxidant inorganic mineral acid and a compatible soluable complexing agent.

11. The process as claimed in claim 1, wherein during said regenerating step, the concentration of hydrochloric acid is adjusted to be in the range of 1 to 9 molar.

12. The process as claimed in claim 11, wherein said regenerating step includes adjusting the concentration of hydrochloric acid to approximately 3 molar.

13. The process as claimed in claim 12, wherein said regenerating step includes adjusting the concentration of sodium chloride to approximately 2.5 molar.

14. The process as claimed in claim 1, wherein during said step of regenerating the organic solution, the concentration of the sodium chloride is adjusted to be between 0 and that corresponding to saturation.

* * * * *